Dec. 10, 1957   P. T. G. DOWELL ET AL   2,815,988
ENDLESS TRACKS FOR VEHICLES
Filed Jan. 19, 1954   4 Sheets-Sheet 1
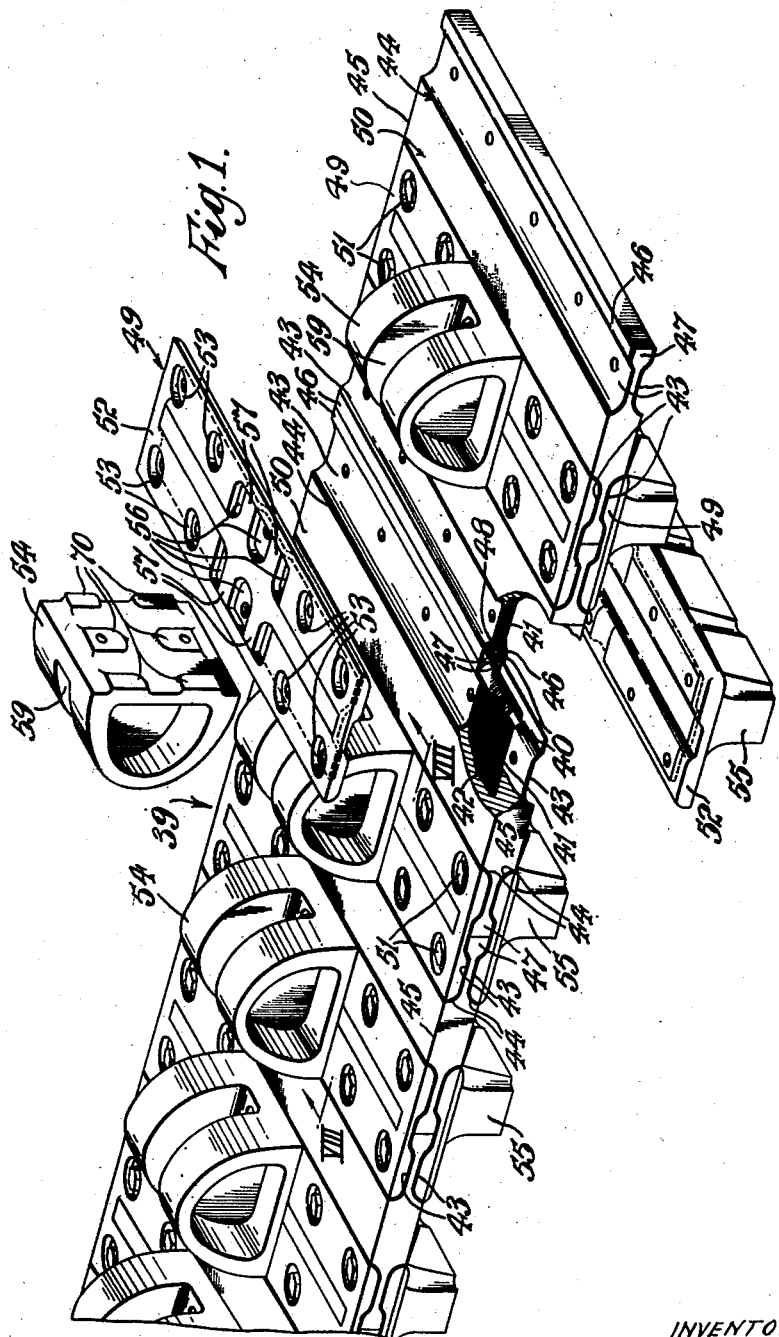
INVENTORS
Peter Thomas George Dowell
Horace Francis Pumphrey
by Benj. T. Rauber
their attorney Dec. 10, 1957  P. T. G. DOWELL ET AL  2,815,988
ENDLESS TRACKS FOR VEHICLES
Filed Jan. 19, 1954  4 Sheets-Sheet 2
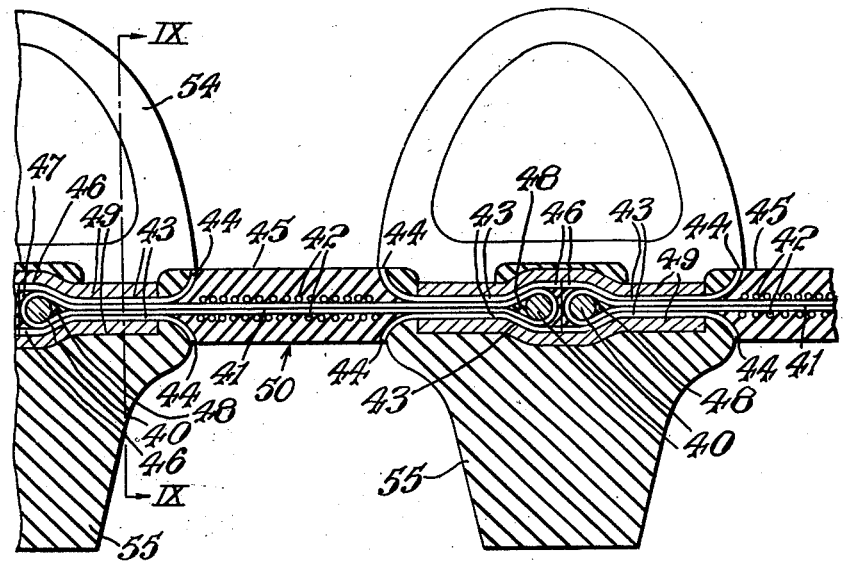
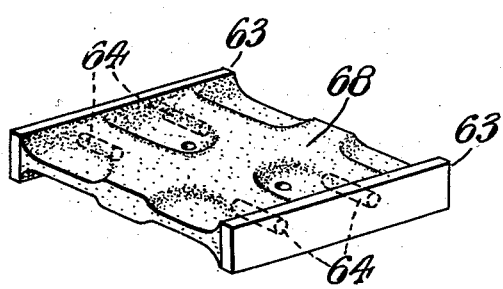
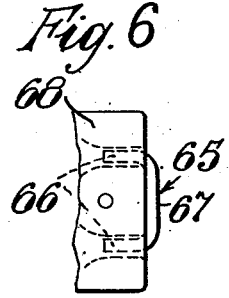
INVENTORS
Peter Thomas George Dowell
Horace Francis Pumphrey
by Benj. T. Rauber
their attorney

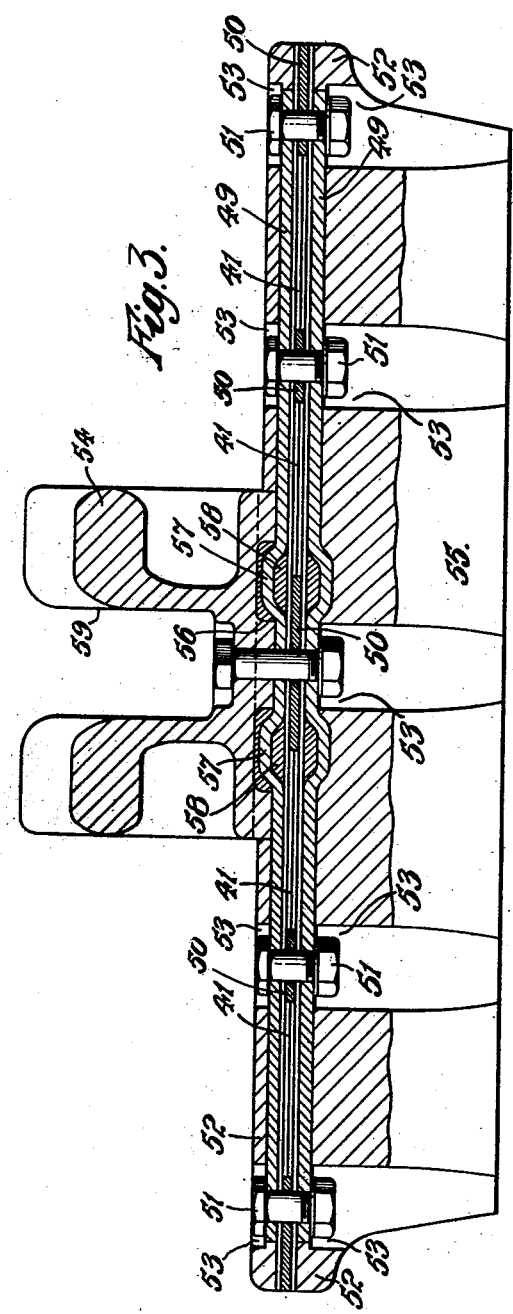

Dec. 10, 1957 P. T. G. DOWELL ET AL 2,815,988
ENDLESS TRACKS FOR VEHICLES
Filed Jan. 19, 1954 4 Sheets-Sheet 4
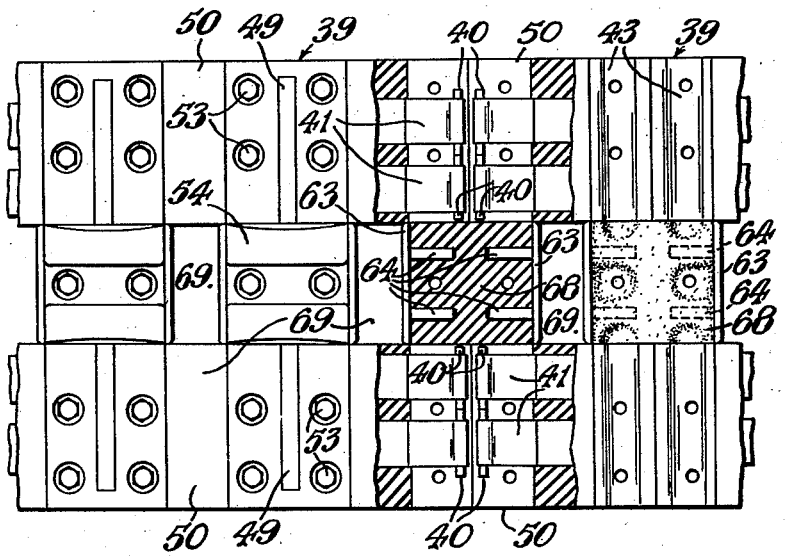
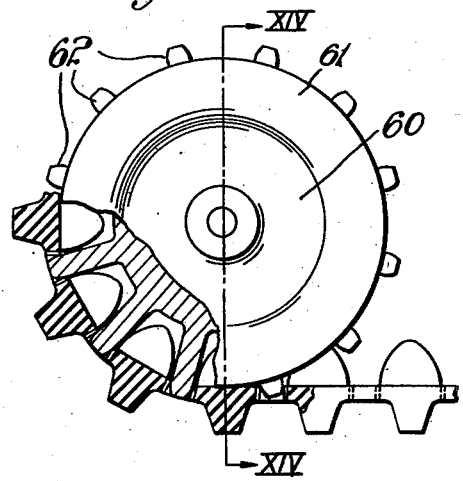
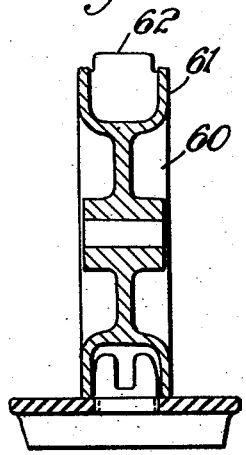
INVENTORS
Peter Thomas George Dowell
Horace Francis Humphrey
by Benj. T. Rauber
their attorney United States Patent Office 2,815,988
Patented Dec. 10, 1957

2,815,988

ENDLESS TRACKS FOR VEHICLES

Peter Thomas George Dowell, Atherstone, and Howard Francis Pumphrey, Solihull, England, assignors to Dunlop Rubber Company Limited, London, England, a British company Application January 19, 1954, Serial No. 404,964

Claims priority, application Great Britain January 21, 1953

17 Claims. (Cl. 305—10)

Our invention relates to endless tracks for vehicles and in particular to endless tracks wherein a plurality of flexible plates are connected together by rigid members, and to the plates themselves.

Our invention provides vehicle tracks having flexible plates in which the properties of flexibility and tensile strength for a given track width may be combined to a greater degree than heretofore.

According to the invention a flexible plate for a vehicle track comprises at least one pair of rigid members spaced apart and connected by at least one flexible inextensible member.

According to our invention also an endless track for vehicles comprises a plurality of said flexible plates connected together and associated with elements engageable with a driving sprocket on the inside of the track and with ground-engaging members on the outside.

Preferably each flexible plate consists of two tubes or rods spaced apart and connected together by parallel strands of wire cable, rigid end pieces enclosing the tubes or rods and provided with holes by which they can be bolted to connected members, and a covering of vulcanised rubber or other flexible material, enclosing the cable between the end pieces. The cable may be in the form of a coil wound round the tubes or rods and the windings deformed between them to form two contiguous layers made up of parallel adjacent lengths of cable embedded in the covering.

The covering of each flexible plate may be of natural or synthetic rubber and the rods or tubes may be of metal or rubber or of a composite rubber-metal construction.

Our invention is illustrated, by way of example, in the accompanying drawings wherein Figure 1 is an isometric view of a portion of a vehicle track constructed according to a first embodiment of the invention certain parts being shown cut away and dismantled for the sake of clarity, Figure 2 is a section of a portion of the track on the line II—II in Figure 1, Figure 3 is a section of the track taken on the line III—III in Figure 2, Figure 4 is a partly cut-away plan view of a modification of the track shown in Figure 1, Figure 5 is an isometric view of a fragmentary detail of the track shown in Figure 4.

Figure 6 is a fragmentary plan view of a portion of an alternative of the detail shown in Figure 5, Figure 7 is a partly sectional elevation of a portion of the track shown in Figure 4 in engagement with a vehicle driving sprocket, and Figure 8 is a section on the line VIII—VIII in Figure 7.

In the embodiment shown in Figures 1, 2, and 3, each plate 50 comprises four pairs of spaced apart parallel steel bar 40 extending transversely of the track with the ends of one pair spaced from the ends of adjacent pairs and the bars of each pair connected by lengths of wire cable 41. The cable is wrapped spirally round the pairs of bars and the portions of cable extending between the bars are deformed to provide flat webs. Each web is reinforced by a layer 42 of fabric ply or metal cable on each side, the warps or strands thereof running transversely of the wire cable of the web. The bars are arranged along two spaced apart parallel axes, the bars on each axis being in two spaced apart pairs. The bars and the portions of the web adjacent thereto are enclosed by substantially channel section metal strips 43 extending transversely of the belt, the strips being arranged in pairs on either side of the axes of the bars. The strips are in contact with the portions of cable enclosing the bars and the adjacent webs and their inside lateral edges 44 are bent away from the plane of the webs. A covering of vulcanised rubber 45 encloses the webs and forms a middle portion of the plate between the inside lateral edges 44 of the strips 43, the interior faces of the bent portions of the strips and the faces of the webs being bonded to the covering. The outer transverse edges 46 of the strips extend slightly beyond the bars and the space therebetween is filled in flush with the strip edges by vulcanised rubber 47 Figs. 1 and 2. The triangular-section space formed between each bar and the portions of cable between the adjacent web and the bar is provided with a fillet of rubber 48.

The adjacent transverse edges of successive flexible plates 50 are abutting and each flexible plate is joined to the next adjacent flexible plate by rigid connecting members in the form of a pair of rigid steel connecting plates 49 one on each side of the flexible plates overlapping the steel strips 43 thereof.

The steel strips 43 are clamped between the pair of rigid plates 49 by eight bolts 51 through the rigid plates 49 and through the part of the flexible plates 50 in the spaces between the ends of the bars 40, four bolts passing through each flexible plate laterally intermediate of and outside the portions containing the webs as indicated in Fig. 3. The webs thus remain unpierced by the bolt holes and no reduction in the strength of the flexible plates is occasioned thereby. The accessible faces of the rigid connecting plates 49 are provided with vulcanised rubber coverings 52 bonded thereto, recesses 53 being provided in the coverings adjacent the bolt holes in the connecting plates to accommodate the bolt heads and the nuts thereon.

The faces of the rigid plates 49 in contact with the steel strips 43 of the adjacent flexible plates are profiled to mate with the channel sections of the strips and the tensile force between each pair of connecting plates and the flexible plates bolted thereto is largely transformed into a wedging action between the strips and the connecting plates thus relieving the clamping bolts of shear stress.

On that side of the track adjacent the driving sprockets of a vehicle when the track is in use, hereinafter termed the inside, there is bolted to each connecting plate an upstanding metal dog 54 to engage the driving sprockets, and on the opposite, or outside, of the track each connecting plate has bonded thereon a hard rubber grouser bar 55. The connecting plates on the inside of the track are formed with depressions 56 to mate with projections 70 on the driving dogs whereby the drive from each dog is transmitted directly to the plate thus avoiding undue shear stresses in the bolts connecting the dogs to the plates. The depressions are formed by ridges 57 arranged longitudinally of the track and the hollows of these ridges are filled with vulcanised rubber 58 bonded thereto. The interface between each dog and the corresponding plates may have a layer of packing or jointing material such as viscous rubber solution or a rust-provoking material. Alternatively a thin film of vulcanised rubber may be moulded over the contacting face of the plate.

The shape of the driving dogs is such as to conform with the arrangement of bogie wheels and driving sprockets relevant to the particular vehicle on which the track is to be used. A slot 59 is formed in each dog parallel with the longitudinal axis of the track to engage the centre disc of the sprocket and position the track centrally.

Where (as shown in Figures 7 and 8) the sprockets 60 are flanked by co-axially mounted cylindrical surfaces 61 beyond which the sprocket teeth 62 protrude radially, the drive is directly onto the connecting members to the transverse edges of which are applied hardened tooth contacting surfaces. As shown in Figures 4, 5 and 6 these surfaces may be in the form of flat plates 63 having dowels 64 projecting from one face thereof and inserted into recesses in the lateral edges of the connecting members 49 or as U-shaped round-section members 65, the arms 66 of each U fitting into the recesses and the base 67 of each U which is straight and at right angles to the arms, forming the contacting surface. The recesses for the flat plates 63 or U-shaped members 65 are formed in rubber mouldings 68 located between the rigid plates 43 forming each connecting member 49, the moulding being formed to mate with the hollows formed by the aforedescribed ridges 57 in the rigid plates. The portions of the flat plates 63 or U-shaped members inserted into the recesses may be secured to the mouldings by bonding. The track is formed by two series of flexible plates 50, each plate having only two pairs of rigid bars 40 joined by webs 41 of steel cable, spaced apart side-by-side and secured between the rigid plates on either side of the rubber mouldings 68 by bolts 53 as described above, so that the teeth of a driving sprocket can enter the spaces 69 in the track bounded by the tooth contacting surfaces and the flexible plates. The inside connecting plates are provided with upstanding dogs 54 arranged to engage peripherally spaced recesses between the teeth of the vehicle driving sprocket when the track is in use in order to locate the track laterally.

The grouser bars located on the rigid connecting members may be replaced by similar ground engaging portions contiguous with the vulcanised rubber covering of each flexible plate, and rubber plates for engagement with vehicle track-supporting wheels may also be provided on the said coverings.

The term rubber when used throughout the specification refers to a natural or synthetic rubber composition.

Having described our invention—what we claim is:

1. A vehicle track comprising a succession of alternate rigid and flexible sections, said flexible sections each comprising a pair of parallel, spaced, transverse bars and at least one layer of parallel strands of wire extending longitudinally of said track between and secured to said bars and said rigid sections each comprising a pair of metal plates, one on each side of said transverse bars and covering said transverse bars and adjacent ends of said strands and having a channel in which the bars of adjacent flexible sections are received, fastening means securing said plates at opposite sides of said channel, said fastening means extending from a plate on one side of said bars through the flexible section between said plates, adjacent to one of said transverse bars and between said longitudinally extending wire strands of said flexible section to the plate on the opposite side of the flexible section, each pair of parallel, spaced, transverse bars being between one pair of said fastening means and a layer of rubber composition between successive plates bonded to said strands of wire and to the edges of said metal plates.

2. The vehicle track of claim 1 in which said parallel strands of wire are arranged in groups spaced transversely of said track, in which the spaces between said groups are filled with rubber composition and in which said fastening means pass through said spaces.

3. The vehicle track of claim 1 in which the rigid sections each comprise a strip of metal of channel section between said plates and said bars and having their edges turned outwardly to the surface of the track.

4. The vehicle track of claim 1 in which the outer surfaces of said plates are covered with a layer of rubber bonded thereto, the outer surface of said layer on one side of said track being in substantially the same plane as the outer surface of the rubber bonded to said strands and having openings for access to said fastening means.

5. The vehicle track of claim 1 having metal dogs secured individually to the plates on one side of said track.

6. The vehicle track of claim 5 having rubber grouser bars secured individually to the plates on the other side of said track.

7. The vehicle track of claim 1 in which the strands of wire are wrapped about the bars and flattened to parallel contacting planes between said bars.

8. The vehicle track of claim 1 in which the bars of one flexible section are approximately contiguous and the spaces in said channel about said bars are filled with a rubber composition.

9. The vehicle track of claim 1 having transverse strands on the outer faces of said longitudinally extending strands.

10. The vehicle track of claim 1 in which said transverse bars and longitudinally extending strands are arranged on each side of a central longitudinal zone and which has a filler block of resilient material filling the space in said central zone between said metal plates and a pair of hard, facing plates one anchored to each transverse side of each said filler block and forming the transverse sides of successive spaced openings.

11. The vehicle track of claim 10 in which said hard facing plates have dowel pins extending into and fitting recesses in said resilient blocks.

12. The vehicle track of claim 10 having dogs secured to the metal plates in said central zone thereof on one side of said track and having grouser bars secured to the plates on the opposite side of the track.

13. A vehicle track comprising a succession of alternate rigid and flexible sections, said flexible sections each comprising a pair of parallel transverse bars spaced longitudinally of said track, at least one layer or parallel strands of wire extending longitudinally of said track between and secured to said spaced bars, said strands being arranged in groups spaced transversely of said track, and a resilient, flexible, organic composition covering and bonded to said strands and filling the spaces between said groups of strands, and said rigid sections each comprising a pair of metal plates, one on each side of said track and covering the adjacent transverse bars of a pair of said flexible sections and end portions of said longitudinally extending strands and having a channel to receive and anchor said transverse bars and fastening means extending through said plates on opposite sides of said channel between the channel and the edges of said plates and through the spaces between said groups of strands.

14. The vehicle track of claim 13 having a dog mounted on the outer face of each plate on one side of the track and a ground engaging tread mounted on the outer face of each plate on the other side of said track.

15. The vehicle track of claim 13 in which both bars are mounted closely contiguous to the bars of an adjacent section in a common channel of each plate and in which the remaining space in said channel is filled with a resilient, flexible, organic composition.

16. An endless track for vehicles comprising two parallel spaced apart series of flexible members, each of said members comprising at least one pair of parallel spaced apart rigid bars connected by at least one layer of parallel strands of wire, a rigid end member enclosing a pair of adjacent bars of successive flexible members, each of said end members being formed by two complementary channel-shaped metal strips, a flexible casing of vulcanized rubber composition enclosing said flexible members and bonded to said strips, pairs of connecting plates, one on the inside and one on the outside of the track extending transversely across the track connecting adjacent bars of successive flexible members and profiled for engagement of said strip elements mounted on the inside plates engageable with a track driving sprocket and ground engaging members on the outside plates, and bolts securing together the plates of each pair.

17. An endless track according to claim 16 wherein a molding of vulcanized rubber composition fills the space between the rigid plates of each said connecting member defined by the edges of said rigid plates and the longitudinal, opposed, surfaces of said flexible members of the series, each said molding being provided with metal bearing surfaces adjacent the edges of said rigid plates.

References Cited in the file of this patent

UNITED STATES PATENTS

| | | |
|---|---|---|
| 1,949,423 | Knox et al. | Mar. 6, 1934 |
| 1,966,450 | Knox | July 17, 1934 |
| 2,338,550 | Sloman et al. | Jan. 4, 1944 |
| 2,385,453 | Leguillon | Sept. 25, 1945 |
| 2,410,507 | Knight | Nov. 5, 1946 |
| 2,592,916 | Leguillon | Apr. 15, 1952 |

FOREIGN PATENTS

| | | |
|---|---|---|
| 1,014,612 | France | June 18, 1952 |